United States Patent [19]

Löliger

[11] Patent Number: 4,916,885

[45] Date of Patent: Apr. 17, 1990

[54] FILLING HEAD FOR ASEPTICALLY FILLING A PACK

[75] Inventor: Willi Löliger, Konolfingen, Switzerland

[73] Assignee: Nestec S.A., Vevey, Switzerland

[21] Appl. No.: 268,699

[22] Filed: Nov. 8, 1988

[30] Foreign Application Priority Data

Nov. 25, 1987 [CH] Switzerland .......................... 4584/87

[51] Int. Cl.[4] .................... B65B 55/08; B65B 55/10; B65B 43/26; B65B 7/02
[52] U.S. Cl. ........................................ 53/570; 53/268; 53/381 R; 53/381 A; 53/373
[58] Field of Search ................. 53/425, 426, 452, 468, 53/469, 473, 479, 558, 570, 268, 275, 373, 381 R, 381 A, 109, 510, 267, 512, 202

[56] References Cited

U.S. PATENT DOCUMENTS

| | | | |
|---|---|---|---|
| 4,519,184 | 5/1985 | Brunswick | 53/268 X |
| 4,729,204 | 3/1988 | Weiss | 53/510 X |
| 4,805,378 | 2/1989 | Anderson | 53/570 X |

Primary Examiner—Horace M. Culver
Attorney, Agent, or Firm—Vogt & O'Donnell

[57] ABSTRACT

An apparatus for aseptically filling a pack, held in position by a pack support which is designed for sealing the filled pack, has a filling head housing part encompassing and defining a filling head space for receiving and delivering fluid to be filled in the pack. A vertically displaceable valve, which has a valve opening and closure element which is positioned in the filling head space and which extends to and terminates in a cutting means for cutting a membrane of a pack to be filled, controls delivery and regulates the flow rate of the fluid to be filled in a pack from a fluid inlet and outlet pipe. An inlet valve and an outlet emptying valve connected to a bottom of lateral walls of the filling head space provide a sterilizing medium to the filling head space and remove it and any residual fluid from the filling head space.

14 Claims, 6 Drawing Sheets

FILLING HEAD FOR ASEPTICALLY FILLING A PACK

BACKGROUND OF THE INVENTION

This invention relates to a process and a device for aseptically filling with a fluid a pack provided with a spout incorporating an outer tearable membrane.

European Patent Application No. 72 699 already describes a device for aseptically filling a pack with a fluid comprising a filling head with a valve for regulating the flow rate of the fluid into a pack provided with a spout incorporating an outer tearable membrane. This device has a number of disadvantages. Firstly, during the filling process, it is the pressure of the fluid which tears the outer membrane, leading to totally unpredictable tears which can extend into the sealing zone for the closure of the pack and can thus lead to breaks in the fluid-tightness of the pack. The device according to the patent application in question comprises a system with two independent movements on the vertical shaft for the delivery of the fluid on the one hand and to create a vacuum in the head space on the other hand. Finally, this device necessitates the presence on the vertical shaft of seals of which the useful life is limited and which can cause bacterial infection when they are worn.

SUMMARY OF THE INVENTION

The present invention enables a process and a system with none of the above-mentioned disadvantages to be placed at the disposal of the user. According to the invention, the outer membrane tears cleanly in a defined manner, the valve for regulating the delivery rate of the fluid has only a single movement and hence, only one drive, and there is no seal to be replaced at frequency intervals.

The present invention relates to a process for aseptically filling, with a fluid, a pack provided with a spout incorporating an outer tearable membrane in which—the pack being sterile and closed—the filling head space and the outer part of the tearable membrane are sterilized, the outer tearable membrane is cut and the fluid is concomitantly admitted into the pack and, on completion of the filling process, the delivery of fluid is shut off and a sterilizing medium of steam or sterile air is admitted to displace the remaining fluid from the filling head space to an emptying pipe, the sterilizing medium of steam or sterile air being admitted laterally in relation to the direction in which the fluid is displaced.

The preliminary sterilization of the filling head space takes place for 2 to 30 seconds at a temperature between 135° and 165° C. and under a steam pressure of 2 to 6 atmospheres.

On completion of the filling cycle, the cleaning operation takes place with steam under a pressure of 1 to 4 atmospheres for a time of 0.5 to 2 seconds at a temperature in the range from 120° to 150° C. When sterile air is used, it is introduced under a pressure of from 0.5 to 3 atmospheres and at ambient temperature.

The invention also relates to a device for carrying out this process comprising a filling head and a pack support disposed beneath the filling head and designed to seal the pack on completion of the filling cycle, the filling head comprising a valve for regulating the delivery rate of the fluid, a fluid inlet and outlet pipe and, arranged laterally at the bottom of the filling head in relation to the axis of the fluid inlet and outlet pipe, a steam inlet valve and a valve with a steam outlet and emptying pipe for the cleaning operation at the end of the filling cycle. In addition, the lower part of the valve for regulating the fluid delivery rate acts as a closure/opening for the fluid and comprises cutting means for cutting the tearable membrane during the opening of said valve. The lower part of the valve is understood to be the part nearest the spout incorporating the tearable membrane.

DETAILED DESCRIPTION OF THE INVENTION

In the context of the invention, a pack is understood to be both a plastic pack and a cardboard pack or any other type of pack for the food or medical field. By fluid is meant both an aqueous solution and also milk, juices of fruits or vegetables or more viscous products, such as jam, marmalade and the like with or without pieces.

Normally, the fluid inlet and outlet pipes are extensions of one another. The pack support is formed by jaws to hold the pack in place and a sealing head.

Before the filling process, the filling head space and the outer surface of the tearable membrane are sterilized. This is done by means of the sterilizing medium inlet valve. The other valve arranged laterally at the bottom of the filling head is used on the one hand for the removal of the sterilizing medium during sterilization and on the other for the removal of residual fluid on completion of filling. These two valves are situated either on each side or parallel on the same side of the plane formed by the axis of the fluid inlet and outlet pipe and the axis of the valve for regulating the fluid delivery rate and perpendicularly of the axis of the fluid inlet and outlet pipe.

It is obvious that the fluid inlet and outlet pipe is also sterilized before filling.

In the device according to the invention, the axis of the valve for regulating the fluid delivery rate forms an angle of 40° to 80° with the axis of the sterilizing medium inlet valve and with the axis of the sterilizing medium outlet and emptying valve.

The major advantage of the device according to the invention is that is provides a filling system in which it is possible, in a single movement and hence, with a single drive, to tear the outer membrane and at the same time to admit the fluid into the pack.

It is the lower part of the valve for regulating the fluid delivery rate which serves as a closure/opening for entry of the fluid. The opening is frustoconical or cylindrical in shape. In the case of a fluid containing pieces, it is better to choose a cylindrical opening because there is then little danger of the pieces remaining jammed during closure of the valve. The seals on the closure are arranged either at the bottom of the valve or at the opening where the fluid enter the pack.

The bottom of the valve fore regulating the fluid delivery rate also comprises the cutting means. In the case of a fluid with no pieces, it is better to choose radial and vertical cutters, for example two cutters arranged perpendicularly, as the cutting means. However, it is also possible to provide more than two cutters. In the case of a fluid containing pieces, it is better to choose cutting means in the form of U-shaped cutters and, in this case, an intermediate flow chamber is provided between the fluid delivery pipe and the pack.

At least two types of pack may be envisaged: either a pack with a spout comprising an inner closure membrane, the type shown in the drawings and in European Patent Application No. 72 699, or a pack with a spout with no inner closure membrane. In this case, the pack is closed by direct sealing of the face of the pocket against the spout.

The valve for regulating the fluid delivery rate comprises a flexible membrane or a bellows membrane which establishes fluid-tightness between the passage of the fluid and the purely mechanical parts.

During the introduction of a new pack, the steam inlet valve may be at least partially open in order to avoid any bacterial infection.

By means of the filling device according to the invention, it is possible to construct an entire aseptic filling line in which at least two of the devices described above are arranged in series. Between two and eight filling devices are preferably provided.

The invention is described in more detail with reference to the accompanying drawings.

DETAILED DESCRIPTION OF THE INVENTION

Figure 1:
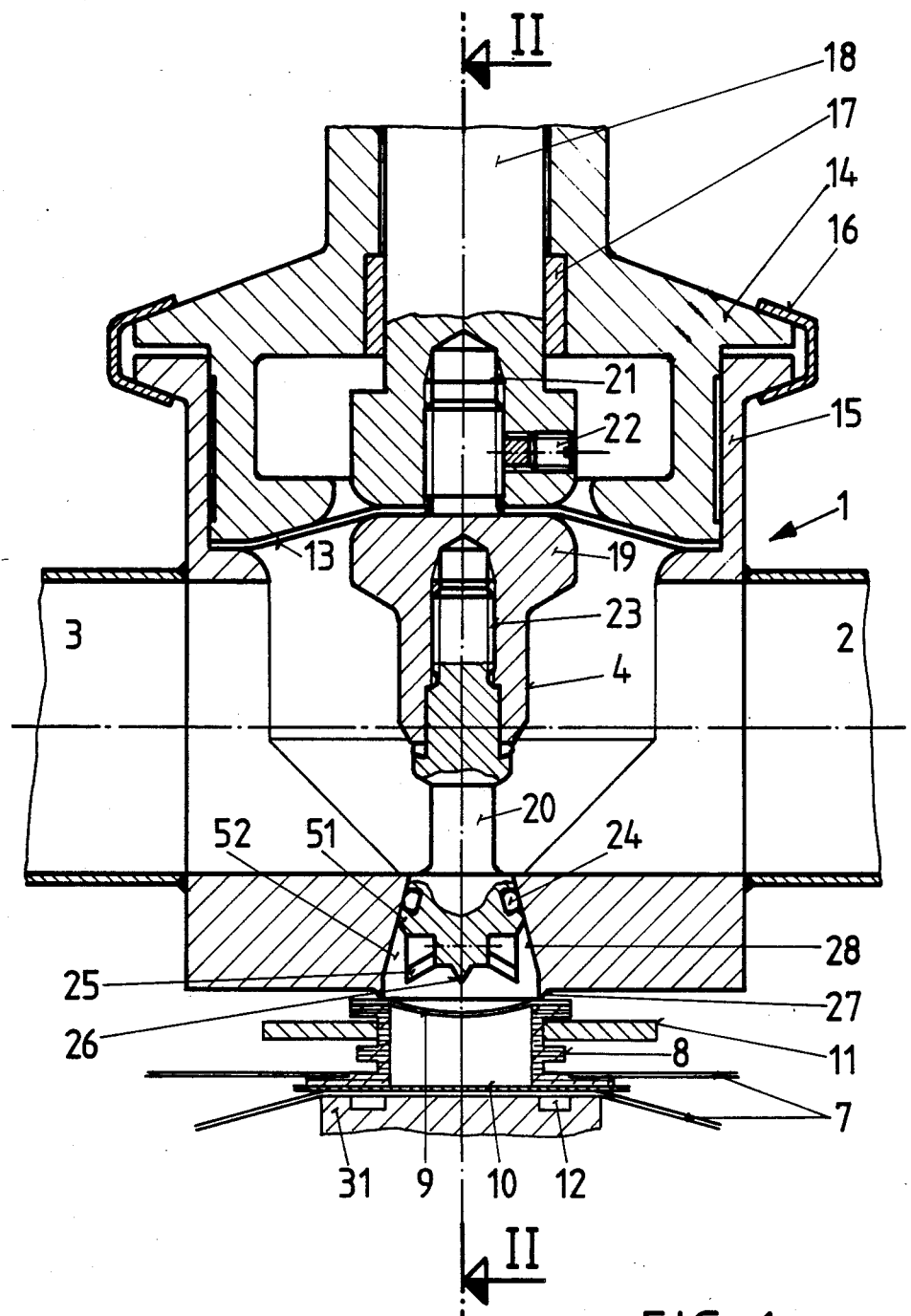
FIG. 1 is a section through the device according to the invention with the fluid inlet valve in its closed position.

The filling head denoted by the reference (1) comprises a fluid inlet and outlet pipe (2), (3), a valve (4) for controlling delivery and for regulating the fluid delivery rate, a steam inlet valve (5) and steam outlet and emptying valve (6) for residual fluid. The pins of the valves (5) and (6) are displaceable by pneumatic or similar system (not shown).

Hence, the filling head apparatus has a filling head housing part (28) encompassing and defining a filling head space (52) having a top for receiving fluid to be filled in a pack, lateral walls and a bottom for delivering the fluid to a pack. The fluid inlet and outlet pipe (2), (3) delivers fluid to the regulating valve and passes on fluid not delivered by the regulating valve to the filling head space and has a longitudinal axis perpendicular to the longitudinal axis of the pin of vertically displaceable valve (4) connected to a valve opening and closure element which is positioned within the filling head space and which extends to and terminates in a cutting means for opening and closing the top of the filling head space to flow of fluid into the filling head space for controlling delivery and regulating a flow of fluid into the filling head space and for, upon being displaced towards the bottom of the filling head space for opening the top of the filling head space for delivery of fluid to the filling head space, cutting a tearable membrane of a sealed pack to be filled for enabling filling of the pack with the fluid. As also illustrated, the sterilizing medium inlet valve and the outlet emptying valve are connected to the lateral walls of the filling head space.

A pack (7), comprising a spout (8) with a tearable membrane (9) and a closure membrane (10) partially sealed against the spout (8) to allow filling, is placed beneath the actual filling head. The pack is held in place by jaws (11) beneath which is arranged the sealing head (31) which closes the pack on completion of filling. The sealing head comprises a sealing ring (12).

The filling head comprises a flexible membrane (13) held between the two parts (14,15) fixed together by the locking ring (16). This flexible membrane consists of polytetrafluoroethylene or of rubber or of any flexible material of high mechanical and thermal stability. The pin of the valve (4) is vertically displaceable by pneumatic or similar systems (not shown) between bushings (17).

The membrane (13) is holed at its centre and traversed by the pin of the valve (4). This pin is in three parts: the upper part (18) into which the part (19) holding the flexible membrane (13) is screwed by the bolt (21). The locking screw (22) ensures a good hold and, hence, fluidtightness of the membrane (13). Finally, the pin comprises a lower part (20) screwed into the element (19) by means of the bolt (23). This part (20), which comprises a cone (51), serves as an opening/closure for filling of the pack. It comprises a seal (24) and two perpendicularly arranged radial cutters (25). These cutters form a central point (26) enabling cutting of the membrane (9) to be even further improved. An annular protuberance (27) provides for effective holding of the membrane (9) during the downward movement of the cutting element (25) and during sterilization. Several concentric annular protuberances may be provided in order further to improve holding of the membrane (9).

Figure 2:
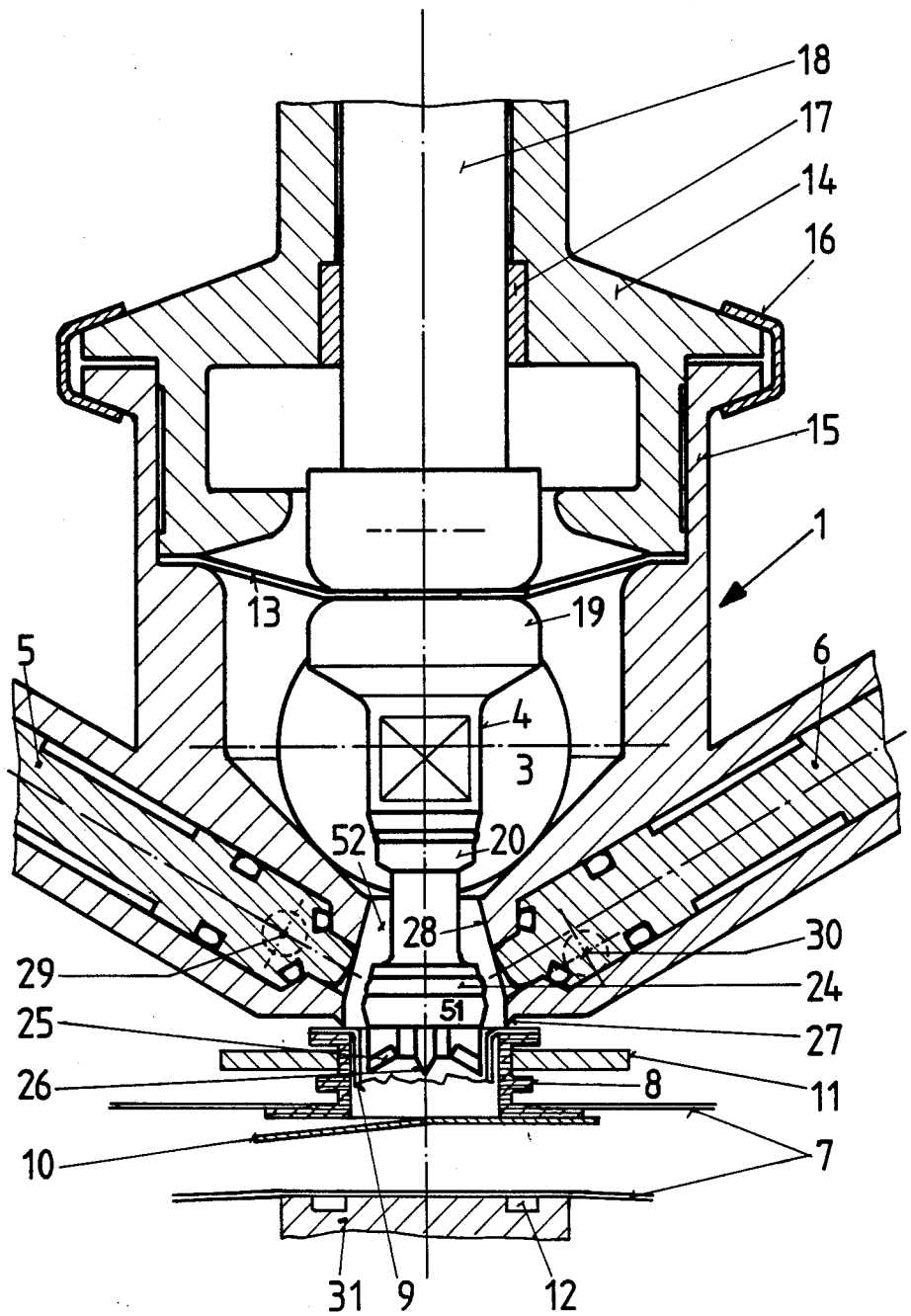
FIG. 2 is a partial section on the line II—II of FIG. 1 through a first embodiment with the fluid inlet valve in its open position.
Figure 3:
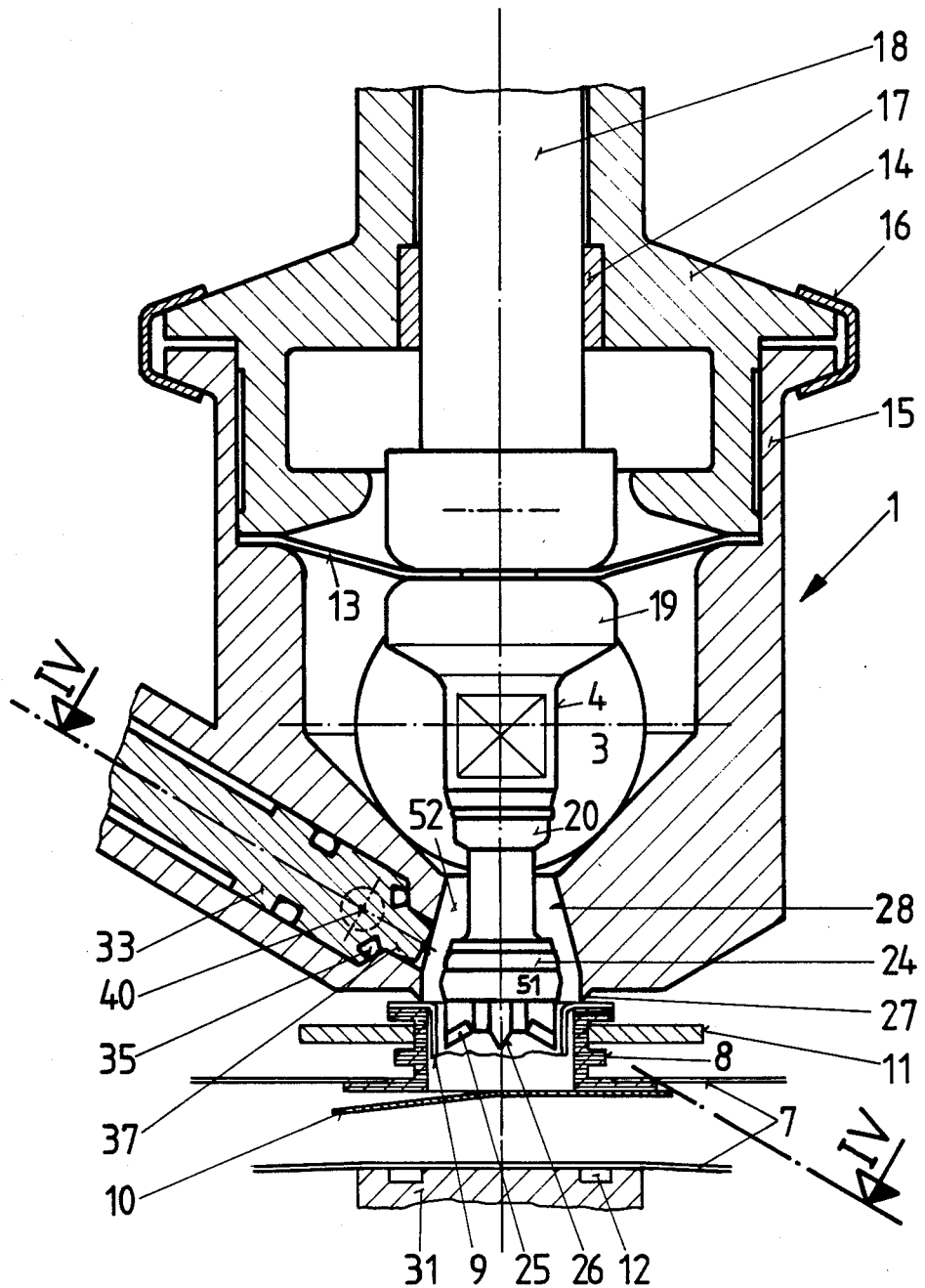
FIG. 3 is a partial section on the line II—II of FIG. 1 through a second embodiment with the fluid inlet valve in its open position.

In the case of FIGS. 1, 2 and 3, the opening (28) for the passage of the fluid is frustoconical in shape. This opening also forms the seat for the cone (51).

The device operates as follows:

With the valve (4) in its closed position (FIG. 1) and the pack (7) in place, the head space (52) and the membrane (9) are sterilized by opening of the steam inlet valve (5). The steam arrives through the pipe (29). It leaves through the pipe (30) via the valve (6). On completion of sterilization, the two valves (5) and (6) are closed and the valve (4) is opened (FIG. 2). The element (20) descends and the cutters (25) open the tearable membrane (9). At the same time, the fluid is released and enters the pack (7) through the opening (28). It is obvious that, during filling, the sealing head (31) is in its lower position. On completion of filling, the sealing head ascends, the valves (5) and (6) are opened so that the steam displaces the residual product which flows out through the pipe (30). During or after this cleaning operation, the sealing ring (12) is heated, thus closing the pack (7). The jaws (11) may then release the pack.

To avoid infection of the filling head space while the pack is being changed, the steam inlet valve (5) is left open or half-open.

Figure 4:
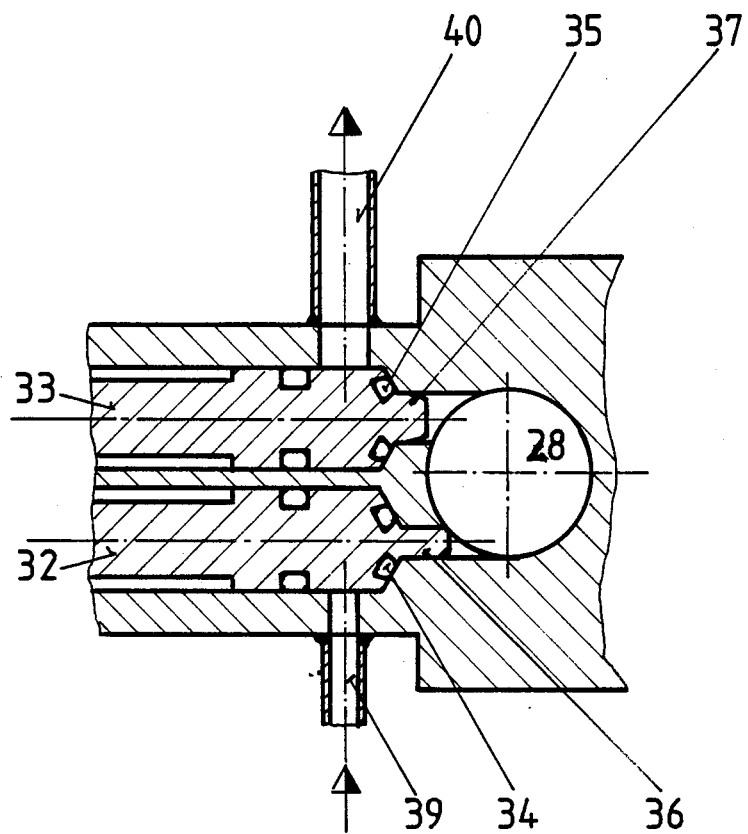
FIG. 4 is a section on the live IV—IV of FIG. 3.

FIGS. 3 and 4 show the device according to the invention in a second embodiment. The elements which are identical with those of FIGS. 1 and 2 are denoted by the same reference numerals. This device differs from that shown in FIGS. 1 and 2 in that the stem inlet valve (32) and steam outlet and emptying valve (33) are disposed on the same side of the plane formed by the axis of the fluid inlet and outlet pipe and the axis of the valve for regulating the fluid delivery rate. The device is otherwise identical with the previous embodiment. The pins of the valves (32) and (33) are displaced under the power of the same drive, for example a single pneumatic system (not shown). Accordingly, this represents the major advantage over the device shown in FIGS. 1 and 2. Each valve pin has a seal (34) and (35) and needles (36) and (37) of different shape. The steam arrives through the pipe (39) and leaves through the pipe (40). Because the pins of the valves (32) and (33) have the same drive, they slide synchronously.

The advantage of having different needles (36) and (37) is as follows: when the valves (32) and (33) are closed after sterilization of the filling head space or after cleaning, the valve (32) closes first, thus leaving the possibility for the steam or the residual product to leave by the pipe (40). The remaining operations are the same as in FIGS. 1 and 2.

Figure 5:
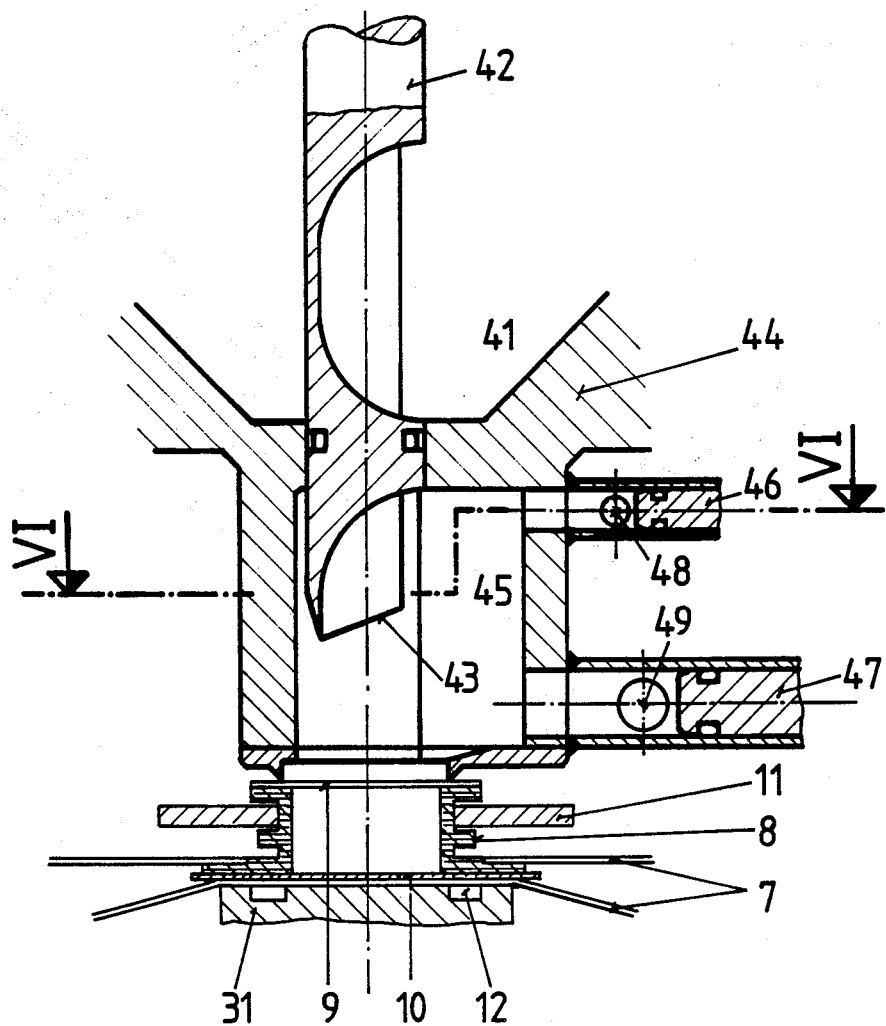
FIG. 5 is a section through a third embodiment of the device according to the invention.
Figure 6:
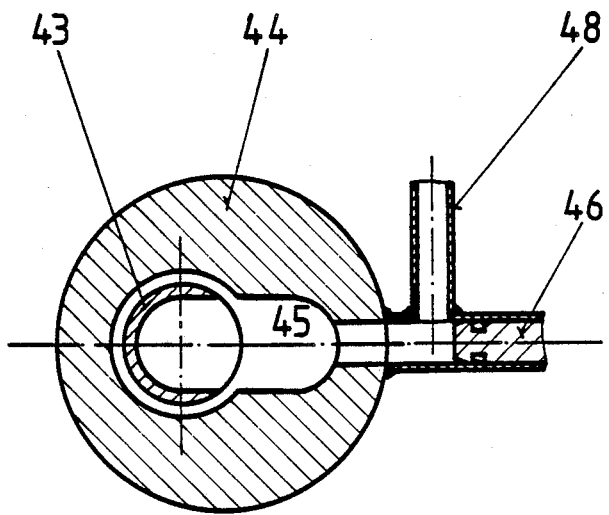
FIG. 6 is a section on the line VI—VI of FIG. 5.

FIG. 5 and 6 show a third embodiment of the device according to the invention in which the cutters have a specific shape. This shape is more especially suitable for the filling of a pack with a fluid containing pieces. Since the pack and the sealing head are the same as for FIGS. 1 to 4, they have been denoted by the same reference numerals. The fluid inlet pipe (41) is closed by the valve (42). This valve has a U-shaped cutter (43). The filling head (44) comprises an intermediate chamber (45) between the pipe (41) and the spout (8) of the pack (7). The valve (46) comprises a steam inlet pipe (48) while the valve (47) comprises an emptying pipe (49). It should be noted that the valves (46) and (47) are not side-by-side, but superposed. They may also have a single drive which synchronously opens and closes them. The mode of operation is the same as for FIGS. 1 to 4. The filling head space and the membrane (9) are sterilized by opening of the valves (46) and (47). These valves are then closed again and the fluid inlet valve (42) is opened. During the downward movement of the valve (42), the cutter (43) cuts the membrane (9) and filling takes place. The chamber (45) adjacent the filling head space immediate about the pin and cutter provides for smooth flow of the fluid, particularly in cases where pieces are present. On completion of filling, the valve (42) is closed and the intermediate chamber (45) is cleaned. The sealing head (31) is then raised and the sealing ring (12) seals the closure membrane (10) against the spout (8). In the absence of a closure membrane, it is directly the wall of the pack which is sealed against the spout (8).

Accordingly, several devices of the type shown in FIGS. 1 to 6 may be arranged in series in an aseptic filling line.

The invention thus provides an aseptically very safe device which is simpler in design than known devices in the field in question and which enables a very clean cut to be made in the tearable membrane.

I claim:

1. An apparatus for aseptically filling a pack comprising:
   a filling head housing part encompassing and defining a filling head space having a top for receiving fluid to be filled in a pack, lateral walls and a bottom for delivering the fluid to a pack;
   a vertically displaceable valve comprising a pin connected to a valve opening and closure element which is positioned within the filling head space and which extends to and terminates in a cutting means for opening and closing the top of the filling head space to flow of fluid into the filling head space for controlling delivery and regulating a flow rate of fluid into the filling head space and for, upon being displaced towards the bottom of the filling head space for opening the top of the filling head space for delivery of fluid to the filling head space, cutting a tearable membrane of a sealed pack to be filled for enabling filling of the pack with the fluid;
   a fluid inlet and outlet pipe for delivering the fluid to the regulating valve and passing on fluid not delivered by the regulating valve to the filling head space, the fluid inlet and outlet pipe having a longitudinal axis perpendicular to a longitudinal axis of the regulating valve pin; and
   an inlet valve and an outlet and emptying valve, for, respectively, delivery of a sterilizing medium selected from a group consisting of sterile air and steam and removal of the sterilizing medium and any residual fluid connected to a bottom of the filling space lateral walls of the filling head space.

2. An apparatus according to claim 1 wherein the inlet valve and the outlet and emptying valve are positioned along an axis lateral to the longitudinal axis of the fluid inlet and outlet pipe.

3. An apparatus according to claim 2 wherein the inlet valve and the outlet and emptying valve comprise devices having valve pins having a longitudinal axis lateral to the longitudinal axis of the inlet and outlet pipes.

4. An apparatus according to claim 1 wherein the inlet valve and the outlet and emptying valve are disposed perpendicular to the longitudinal axis of the fluid inlet and outlet pipe and on either side of a plane formed by the longitudinal axis of the fluid inlet and outlet pipe and a longitudinal axis of the fluid regulating valve.

5. An apparatus according to claim 4 wherein the inlet valve and the outlet and emptying valve are superposed.

6. An apparatus according to claim 1 wherein the inlet valve and the outlet and emptying valve are disposed perpendicular to the longitudinal axis of the fluid inlet and outlet pipe and parallel on a same side of a plane formed by the longitudinal axis of the fluid inlet and outlet pipes and a longitudinal axis of the fluid regulating valve.

7. An apparatus according to any one of claims 1 to 18 wherein the longitudinal axis of the fluid regulating valve forms an angle of 40° to 80° with the longitudinal axis of the inlet valve and with the longitudinal axis of the outlet and emptying valve.

8. An apparatus according to claim 1 wherein the filling head space is cylindrical in shape.

9. An apparatus according to claim 1 wherein the filling head space is frustoconical in shape and the fluid regulating valve element for sealing and opening the filling head space is a cone.

10. An apparatus according to claim 1 further comprising a flexible membrane in contact with an upper portion of the pin for vertically displacing the pin.

11. An apparatus according to claim 1 wherein the cutting means are radial and vertical cutters.

12. An apparatus according to claim 15 or 4 wherein the cutting means are formed by U-shaped cutters and further comprising a chamber adjacent the filling head space immediately about the pin and cutter.

13. An apparatus according to claim 1 further comprising a pack support for holding the pack adjacent the bottom of the filling head space for filling and a sealing head for sealing the pack after filling.

14. An apparatus according to claim 1 further comprising a plurality of the apparatus connected in series by the inlet and outlet pipe of the apparatus.

* * * * *

UNITED STATES PATENT AND TRADEMARK OFFICE
CERTIFICATE OF CORRECTION

PATENT NO. : 4,916,885
DATED : April 17, 1990
INVENTOR(S) : Willi LOLIGER

It is certified that error appears in the above-identified patent and that said Letters Patent is hereby corrected as shown below:

Column 6, line 43, (line 2 of claim 7), "18" should read --4--.

Column 6, line 57, (line 1 of claim 12), "15" should read --1--.

Signed and Sealed this

Twelfth Day of March, 1991

*Attest:*

HARRY F. MANBECK, JR.

*Attesting Officer*   *Commissioner of Patents and Trademarks*